(12) United States Patent
Scholtens et al.

(10) Patent No.: US 7,539,148 B2
(45) Date of Patent: *May 26, 2009

(54) CIRCUIT INTEGRITY IN A PACKET-SWITCHED NETWORK

(75) Inventors: Dale A. Scholtens, Stickney, IL (US); David Wells, Bar Hill Cambs (GB)

(73) Assignee: Tellabs Operations, Inc., Naperville, IL (US)

( * ) Notice: Subject to any disclaimer, the term of this patent is extended or adjusted under 35 U.S.C. 154(b) by 428 days.

This patent is subject to a terminal disclaimer.

(21) Appl. No.: 11/336,535

(22) Filed: Jan. 20, 2006

(65) Prior Publication Data

US 2006/0120295 A1  Jun. 8, 2006

Related U.S. Application Data

(63) Continuation of application No. 09/632,393, filed on Aug. 4, 2000, now Pat. No. 7,054,273.

(60) Provisional application No. 60/147,462, filed on Aug. 6, 1999.

(51) Int. Cl.
*H01R 31/28* (2006.01)
*H04M 3/32* (2006.01)

(52) U.S. Cl. .............. 370/248; 370/249; 370/352; 370/401; 379/22.01; 379/22.03; 714/714; 714/715

(58) Field of Classification Search ............ 370/241.1, 370/248–250, 352, 354, 384, 385, 389, 396, 370/395.6, 395.61, 395.64, 399, 401, 426; 714/714, 715; 379/16, 22.01, 27.03
See application file for complete search history.

(56) References Cited

U.S. PATENT DOCUMENTS

| 5,251,204 A | 10/1993 | Izawa et al. |
| 5,257,311 A * | 10/1993 | Naito et al. ............... 370/244 |
| 5,313,453 A | 5/1994 | Uchida et al. |

(Continued)

FOREIGN PATENT DOCUMENTS

WO  95 17789  6/1995

(Continued)

OTHER PUBLICATIONS

A Generic ATM Trunking architecture for integration of PSTN/ISDN narrowband services:, ATM Forun/99-0048, Jan. 18, 1999.

(Continued)

*Primary Examiner*—Wing F Chan
*Assistant Examiner*—Saba Tsegaye
(74) *Attorney, Agent, or Firm*—Fish & Richardson P.C.

(57) ABSTRACT

Techniques for performing a continuity check operation include sending a pattern of bits over a packet network connection through a first interface on a packet network to a second interface on the packet network. The first interface is monitored for return of the pattern of bits over the packet network connection. A decision whether the continuity check is successful is based on whether the pattern of bits is detected at the first interface during the monitoring. The techniques can be used for both narrowband as well as broadband calls over the packet network.

20 Claims, 7 Drawing Sheets

U.S. PATENT DOCUMENTS

| | | | |
|---|---|---|---|
| 5,555,261 | A | 9/1996 | Nakayama et al. |
| 5,617,417 | A * | 4/1997 | Sathe et al. .................. 370/394 |
| 5,825,780 | A | 10/1998 | Christie |
| 5,878,032 | A * | 3/1999 | Mirek et al. ................. 370/252 |
| 5,991,301 | A | 11/1999 | Christie |
| 6,023,474 | A | 2/2000 | Gardner et al. |
| 6,031,840 | A | 2/2000 | Christie et al. |
| 6,067,299 | A | 5/2000 | DuRee |
| 6,075,784 | A | 6/2000 | Frankel et al. |
| 6,272,137 | B1 | 8/2001 | Noiri |
| 6,470,019 | B1 | 10/2002 | Howell |
| 6,519,257 | B1 | 2/2003 | Brueckheimer et al. |
| 6,826,181 | B1 * | 11/2004 | Higashida et al. ........... 370/390 |

FOREIGN PATENT DOCUMENTS

WO              98 23053         5/1998

OTHER PUBLICATIONS

IITU-T, Recommendation I.610, B-ISDN Operation and Maintenance Principles and Functions (Nov. 1995).

Committee T1S1 Contribution 9S101470, Titled Signaling Requirements for the support of narrow band services via broadband transport technologies (posted Jun. 20, 1999 at the T1S1 web site).

ITU-T, Recommendation I.732, Functional characteristics of ATM equipment,.(Mar. 1996).

ITU-T, Q.Supp 16, TRQ2140, Signaling requirements for the support of narrowband services via broadband transport technologies, Dec. 1999.

* cited by examiner

| Byte No. | Value |
|---|---|
| 1 | 1111 1111 |
| 2 | 0000 0000 |
| | |
| 3 | 1000 0000 |
| 4 | 0100 0000 |
| 5 | 0010 0000 |
| 6 | 0001 0000 |
| 7 | 0000 1000 |
| 8 | 0000 0100 |
| 9 | 0000 0010 |
| 10 | 0000 0001 |
| | |
| 11 | 0111 1111 |
| 12 | 1011 1111 |
| 13 | 1101 1111 |
| 14 | 1110 1111 |
| 15 | 1111 0111 |
| 16 | 1111 1011 |
| 17 | 1111 1101 |
| 18 | 1111 1110 |
| | |
| 19 | 1010 1010 |
| 20 | 0101 0101 |

FIG. 6

CIRCUIT INTEGRITY IN A PACKET-SWITCHED NETWORK

CROSS REFERENCE TO RELATED APPLICATIONS

This application is a continuation (and claims the benefit of priority) of U.S. application Ser. No. 09/632,393, filed Aug. 4, 2000, which is now U.S. Pat. No. 7,054,273, which is herby incorporated by reference in its entirety. U.S. application Ser. No. 09/632,393 claimed the benefit of priority of U.S. Provisional Patent Application Ser. No. 60/147,462, filed August 1999, which also is incorporated by reference in its entirety.

The following U.S. Patent Applications, filed concurrently with this application and assigned to the assignee of this application, are incorporated herein by reference: (1) "Communications Using Hybrid Circuit-Switched and Packet-Switched Networks," and (2) "Bandwidth Management in a Communications System Using Circuit-Switched and Packet-Switched Networks."

BACKGROUND

The invention relates to circuit integrity in a packet-switched network.

System Signal 7 (SS7) messages are often used to provide control signals in various telecommunications systems, such as telephone systems, and provide a mechanism, known as continuity check, for checking the integrity of a circuit between two switching network endpoints during call setup. Continuity checks originally were developed for analog facilities and consist, for example, of a frequency tone transmitted by the originating exchange and looped back by the receiving exchange. Reception of the returned tone by the originating exchange indicates that the channel is available. In digital environments, use of continuity check operations has been similar.

Recently, packet-domain network architectures, such as asynchronous transfer mode (ATM) networks, have been considered for transporting voice and other narrowband traffic. Packet networks allow connections to be made between endpoints without dedicated inter-switch connections. Fixed-size packets of data, known as cells, are transferred between the ATM switches, which are packet switches that provide virtual circuits between the end points of a network.

With the advent of packet voice networks and the introduction of adaptation between circuit-switched and packet-switched bearers, high-quality integrity checks should be capable of detecting and isolating various types of failures. Traditional testing by continuity check tones, however, is incapable of detecting certain failures such as, for example, impaired bits having low significance with respect to a time-domain multiplexed (TDM) sample value. Therefore, better-quality continuity checking suitable to packet networks is desirable.

SUMMARY

In general, according to one aspect, techniques for performing a continuity check operation include sending a pattern of bits over a packet network connection through a first interface on a packet-switched network to a second interface on the packet-switched network. The first interface is monitored for return of the pattern of bits over the packet network connection. A decision whether the continuity check is successful is based on whether the pattern of bits is detected at the first interface during the monitoring.

In various implementations, one or more of the following features may be present. The technique can be used in connection with both narrowband and broadband communications. The continuity check can be performed, for example, during a set-up process for a narrowband call over a packet network. The call set-up process can include sending Signaling System 7 (SS7) messages. The techniques can include providing a loop that connects incoming and outgoing packet streams associated with the packet network connection. The particular pattern of bits may vary depending on various factors including the type of failures to be detected. The pattern of bits can be sent repeatedly over the packet network connection during the monitoring.

A system for performing continuity check operations for traffic that is to be transported over a packet network also is disclosed. The system can include a first gateway that is coupled to a first interface on the packet network and that is configured to execute continuity check operations. The gateway includes a bit pattern generator arranged to generate a pattern of bits to be sent over a packet network connection, and a bit pattern detector arranged to monitor return of the pattern of bits over the packet network connection. The gateway is configured to decide whether a continuity check is successful based on whether the generated pattern of bits is detected by the bit pattern detector.

The system also can include a second gateway coupled to a second interface on the packet network and configured to provide a loop between incoming and outgoing packet streams associated with the packet network connection. In some implementations, the gateways may be configured to adapt circuit-switched and packet-switched bearers.

Various implementations may include one or more of the following advantages. The techniques described here can help ensure the non-disruptable transfer of data through a packet-switched network. In particular, continuity check operations employing a pattern of bits can be used to test for and isolate a wide range of potential failures that may occur in a packet-domain connection or the adapters terminating the path. Therefore, the continuity checks can help ensure that the circuit will faithfully reproduce the signals traversing it. In some cases, a pattern-based continuity check operation can reduce the number of resources required to execute the test compared to frequency or tone-based continuity check operations.

Other features and advantages will be readily apparent from the following detailed description, the accompanying drawings and the claims.

BRIEF DESCRIPTION OF THE DRAWINGS

FIG. 6 illustrates an exemplary bit pattern.

DETAILED DESCRIPTION

As discussed in greater detail below, improved techniques are described for providing continuity check operations to ensure circuit integrity for communications over a packet-switched network. The techniques involve the exchange of a known pattern of bits during call set up processes rather than sending and detecting tones. The techniques can be used to test the integrity of the packet circuit and the adapters at either end of the circuit.

The particular examples discussed below involve narrowband traffic such as voice calls, modem data or facsimile data, sent over a packet-switched network. However, continuity checks that include a pattern of bits can be used for broadband communications over a packet-switched network as well.

Figure 1:
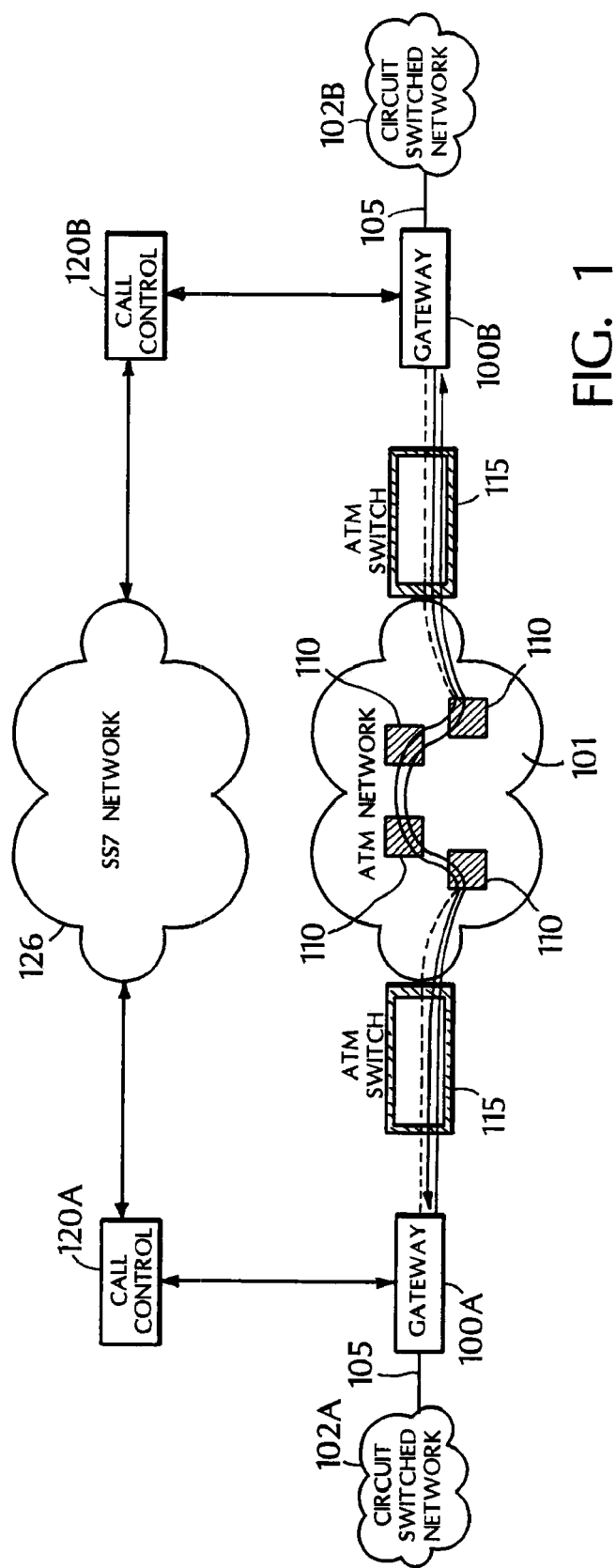
FIG. 1 is a block diagram of a telephone connection through a hybrid ATM network and an associated signaling network.

As shown in FIG. 1, a continuous call path can be established starting with a narrowband Signaling System 7 (SS7) ISDN user part (ISUP) call that originates, for example, in a Public Switched Telephone Network (PSTN) 102A. The path can be established using a virtual circuit over an ATM network 101 and completes on the terminating side in a narrowband circuit-switched SS7 ISUP call to the terminating subscriber through another circuit switched network 102B. A control mechanism interacts with the circuit-switched and packet-switched networks to correlate SS7 and ATM connections to establish a single continuous information path.

Figure 2:
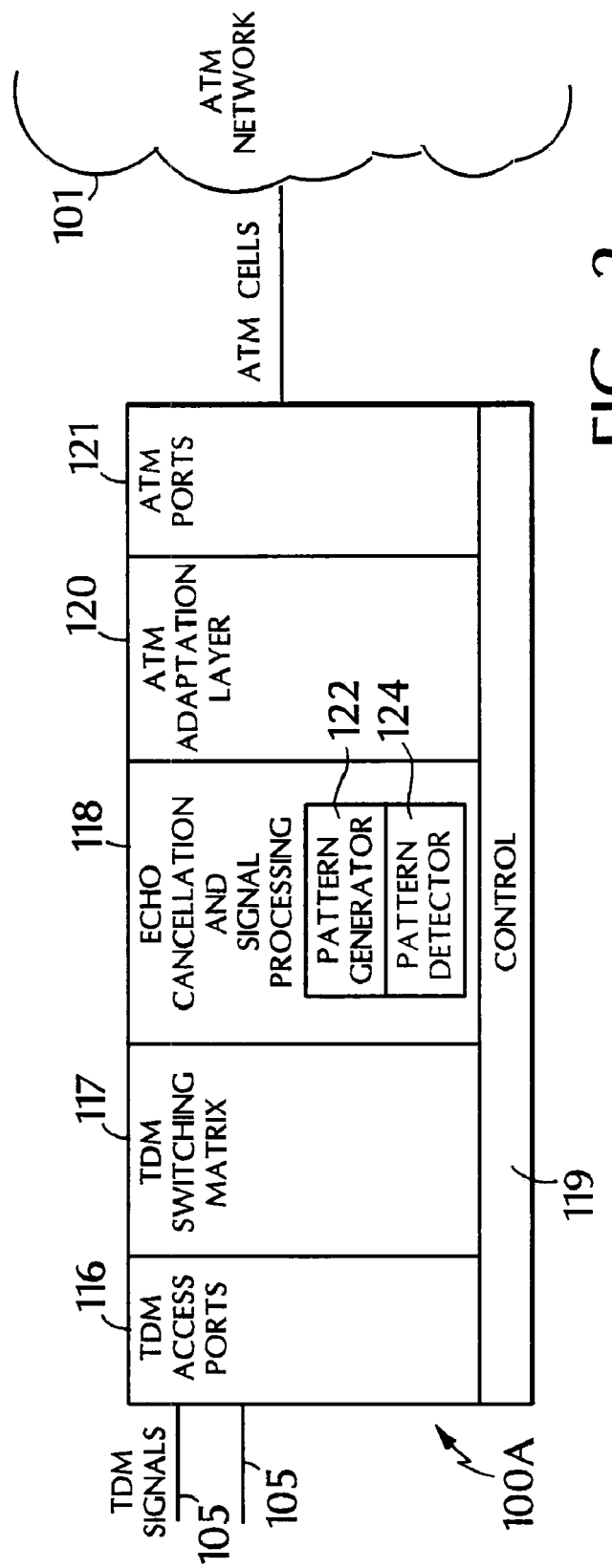
FIG. 2 is a simplified block diagram of an exemplary media gateway.

A large number of individual telephone circuits, such as DS0 circuits, that are to be connected to the packet network 101 can be carried, for example, on fiber optic carriers 105 using time-division multiplexing (TDM) according to the Telcordia Synchronous Optical Network (SONET) standards. The carriers 105 are coupled to access ports 116 in media gateways 100A, 100B (see FIG. 2).

The media gateways 100A, 100B adapt the TDM telephone line signals to packet-based signals and vice-versa. The TDM telephone signals are circuit-switched, in other words, the bit stream can be divided temporally into individual DS0 circuits. By contrast, in packet-based signals, the bit stream can be divided according to the destination address of each packet.

Each gateway 100A, 100B can separate incoming TDM signals into individual DS0 signal streams. In one implementation, shown in FIG. 2, each gateway, such as the gateway 100A, includes a TDM switching matrix 117 that provides full switching capabilities. The switching matrices 117 permit the DS0 circuits to be interconnected flexibly with narrowband channels appearing on the gateways. Echo cancellation and other digital signal processing functions can be performed in a digital signal processing portion 118 of each gateway. The signal processing portion 118 includes a pattern generator 122 and a pattern detector 124 for generating and detecting specified patterns of bits, respectively. The pattern generator 122 and pattern detector 124 can be implemented, for example, using microprocessors, digital signal processors, or custom application specific integrated circuits (ASICs). DS0 signal streams are adapted by an ATM adaptation layer 120 into ATM cells. Each cell is inserted through the ATM ports 21 into an ATM cell stream 135 that traverses an ATM network 101. The gateways include a control section 119 that controls overall operation of the gateway. In one implementation, the gateways 100A, 100B are implemented as Salix 7720 Class-Independent Switches available from Tellabs Operations, Inc.

As illustrated in FIG. 1, each gateway 100A, 100B is connected to a respective ATM end point switch 115. The connection between a gateway and an ATM end point switch 115 and the connection between the ATM end point switch and the ATM network 101 are user-network interfaces (UNIs). Within the ATM network 101, there are a number of ATM switches 110 which are interconnected by network-node interfaces (NNIs).

A call control network 126, which forms part of an existing telephone system, runs parallel to the voice network. The call control network 126 primarily controls telephone switching equipment to connect the originating and terminating ends of a telephone call using SS7 messages. A call controller 120A, 120B is coupled to each gateway 100A, 100B and provides an interface between the gateway and the call control network 126. The exchange of call control signals allows the gateways 100A, 100B to establish a connection through the ATM network 101 to enable the transmission of narrowband traffic between the end points.

Figure 3A:
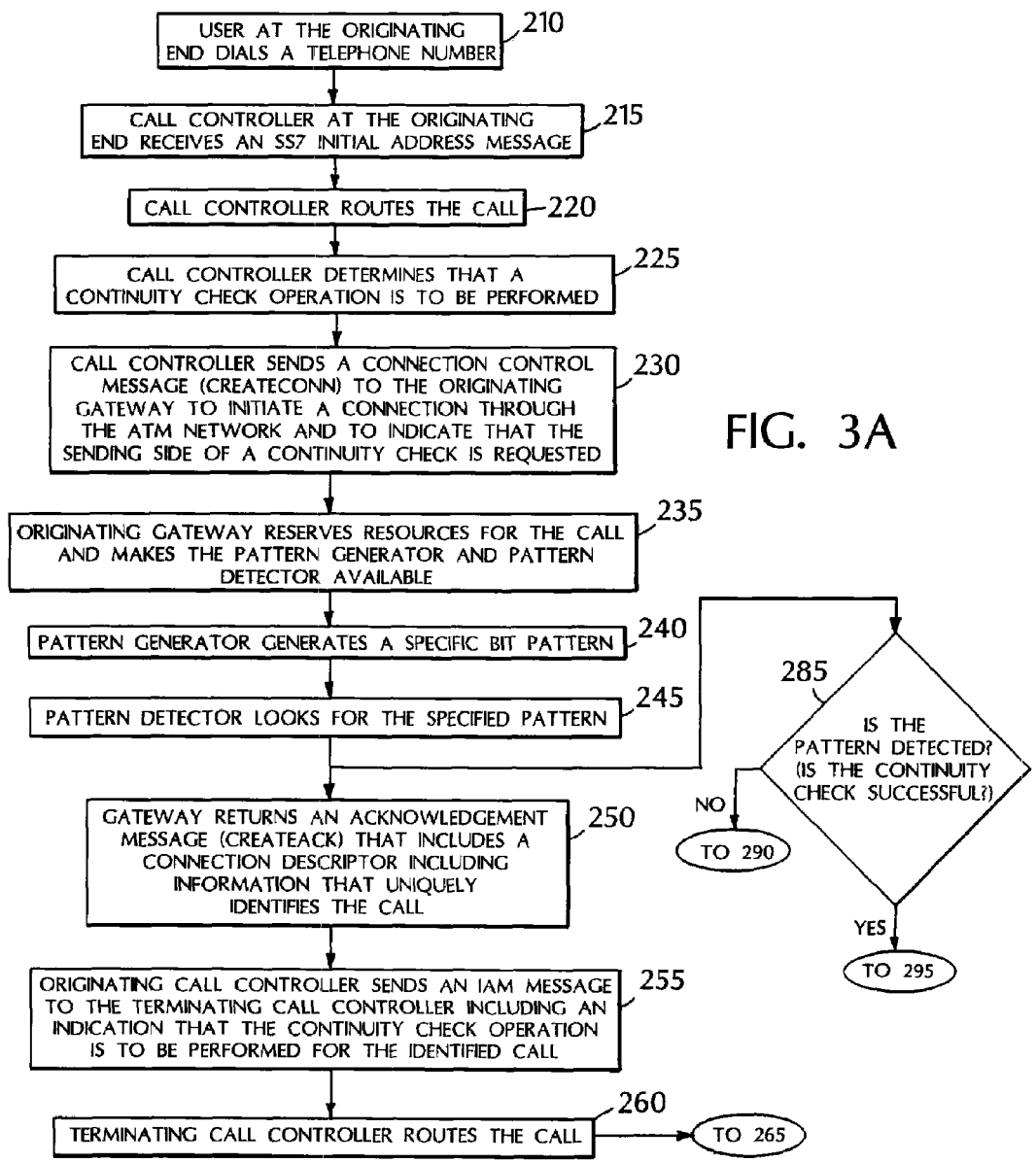
FIGS. 3A and 3B are a flow chart of a method for employing continuity checks in a voice call set up process over an ATM network.
Figure 3B:
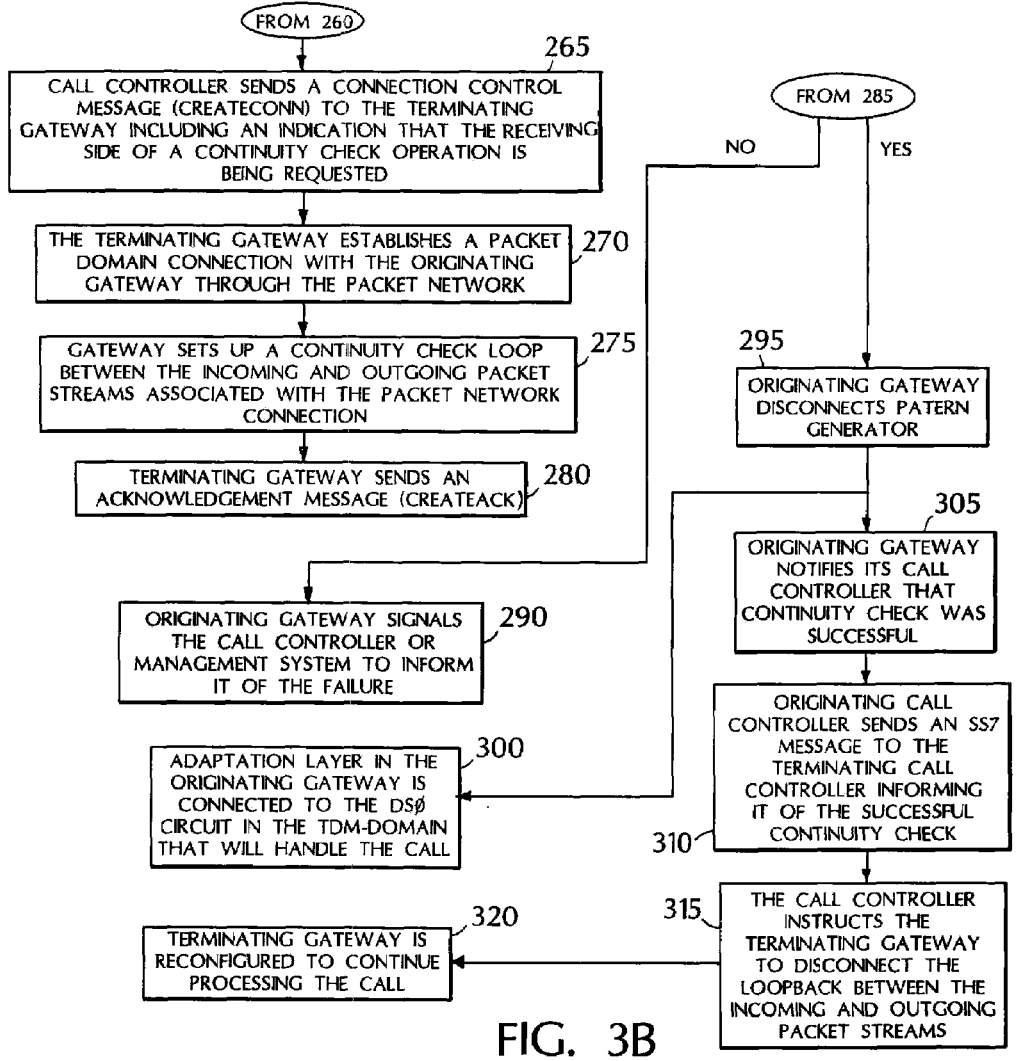
Figure 4:
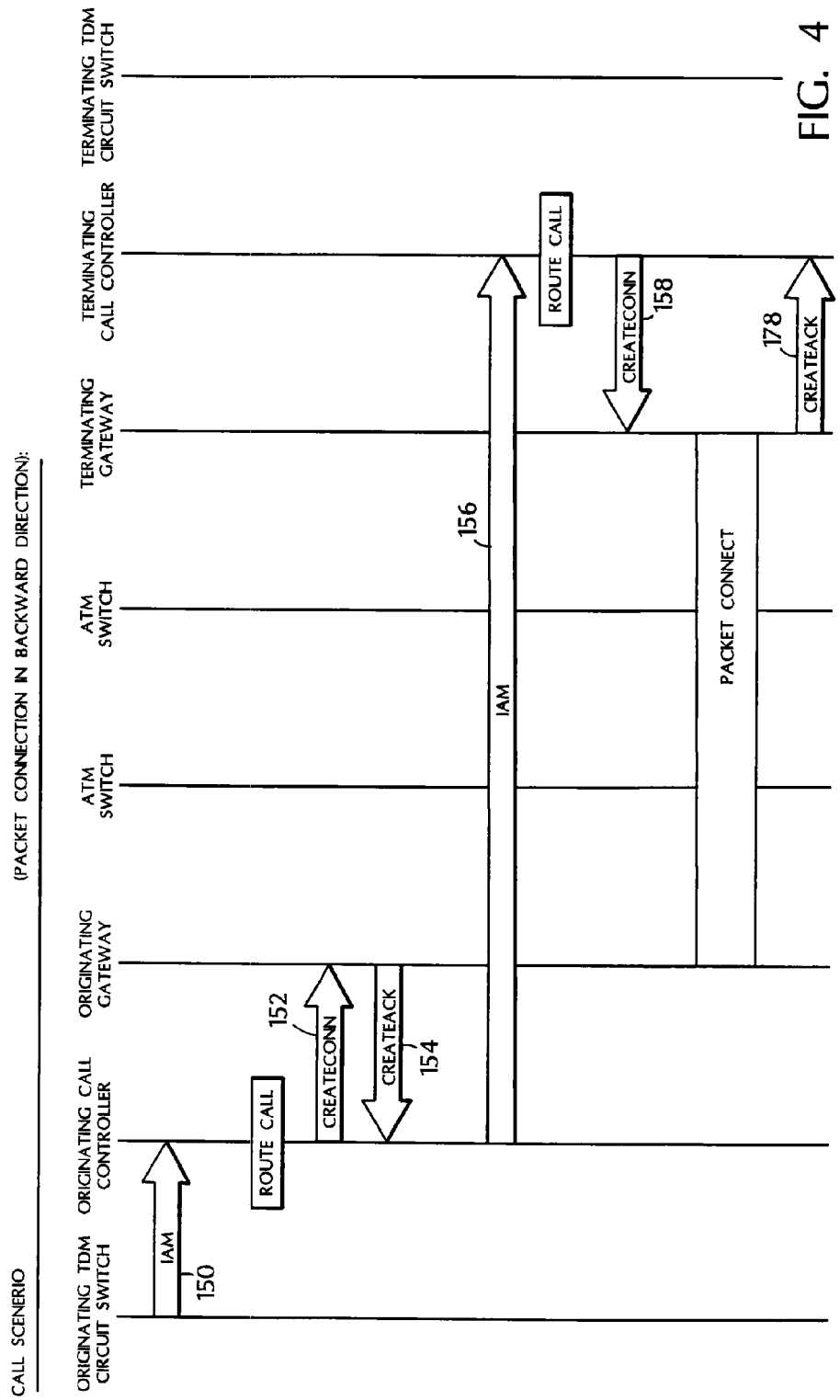
FIG. 4 is a signal flow diagram corresponding to FIG. 3.

As shown in FIGS. 3 and 4, to establish a voice connection, a user at the originating end dials 210 a telephone number. A connection is established through an originating TDM circuit switch in the circuit switched network 102A, and the call controller 120A at the originating end receives 215 an SS7 initial address message (IAM) 150. The call controller 120A routes 220 the call, in other words, it identifies a call controller 120B associated with a terminating DS0 circuit in the circuit switched network 102B. The call controller 120A also determines 225 whether a continuity check operation is to be performed as part of the call set up. A trade-off exists between the desire to perform a continuity check during each call set up and the extra time and overhead associated with performing continuity checks. As a result, typically only a percentage of the call set-ups will include a continuity check operation. In one implementation, approximately 5-10% of call set-ups would include a continuity check operation.

Assuming that the call controller 120A determines that a continuity check operation is to be performed, the call controller sends 230 a connection control message (CreateConn) 152 to the originating gateway 100A to initiate a connection through the ATM network 101. The CreateConn message 152 includes an indication that a sending-side continuity check operation is requested. In response, the gateway 100A reserves 235 resources for the call and makes the pattern generator 122 and pattern detector 124 available. Connections are set up between the adaptation layer 120 and the pattern generator 122 as well as the pattern detector 124. The pattern generator 122 repeatedly generates 240 a specified bit pattern, and the detector 124 monitors 245 the incoming packet stream (if any) for the same bit pattern.

The particular bit pattern used may depend on the application. For example, in one implementation, the pattern generator 122 is programmed to generate a bit pattern such that both binary values in each possible bit position in the packet can be checked. Thus, the pattern generator 122 can generate a sequence of two complementary 8-bit values. Other bit patterns can be generated to allow various types of potential failures to be detected and isolated. Thus, in some implementations, the pattern generator 122 is programmed to generate a bit pattern comprising a sequence of 256 values, in other words, a sequence of all possible 8-bit values. More generally, the pattern generator 122 can be programmed to generate a sequence of all possible n-bit values, where n is the number of bits in each byte.

Another exemplary pattern is illustrated in FIG. 6 and includes twenty 8-bit values. A first byte includes only "1"s, whereas a second byte includes only "0"s. The third through tenth bytes include a single binary "1" with adjacent bytes differing by shifting the binary "1" value from one bit position to an adjacent bit position. Similarly, the eleventh through the eighteenth bytes include a single binary "0" with adjacent bytes differing by shifting the binary "0" value from one bit position to an adjacent bit position. The nineteenth byte includes an alternating pattern of "1" s and "0"s. The twentieth byte includes the inverse pattern of the nineteenth byte. Other bit patterns may be used depending on the specific errors to be detected. Known error detection/correction techniques may be useful in selecting an appropriate bit pattern for a given application.

After making the pattern generator 122 and detector 124 available, the gateway 100A returns 250 an acknowledgement message (CreateAck) 154 that includes a connection descriptor. The connection descriptor includes an ATM address for the gateway 100A as well as information that uniquely identifies the call. The information that uniquely identifies the call can identify a connection-related resource such as the narrowband circuit (e.g., DS0 circuit) handling the call on the originating side.

Next, the call controller 120A sends 255 an IAM message 156 to the terminating call controller 120B. The message 156 includes the information contained in the connection descriptor as well as an indication that the continuity check operation is to be performed. Upon receiving the IAM message 156, the terminating call controller 120B routes 260 the call. In other words, the terminating call controller 120B selects a TDM circuit on a particular gateway, such as the gateway 100B, to handle the call. The call controller 120B then sends 265 a connection control message (CreateConn) 158 to the terminating gateway 100B. The CreateConn message 158 also includes the information contained in the connection descriptor. In addition, the message 158 includes an indication that the receiving-side of a continuity check operation is being requested.

Figure 5:
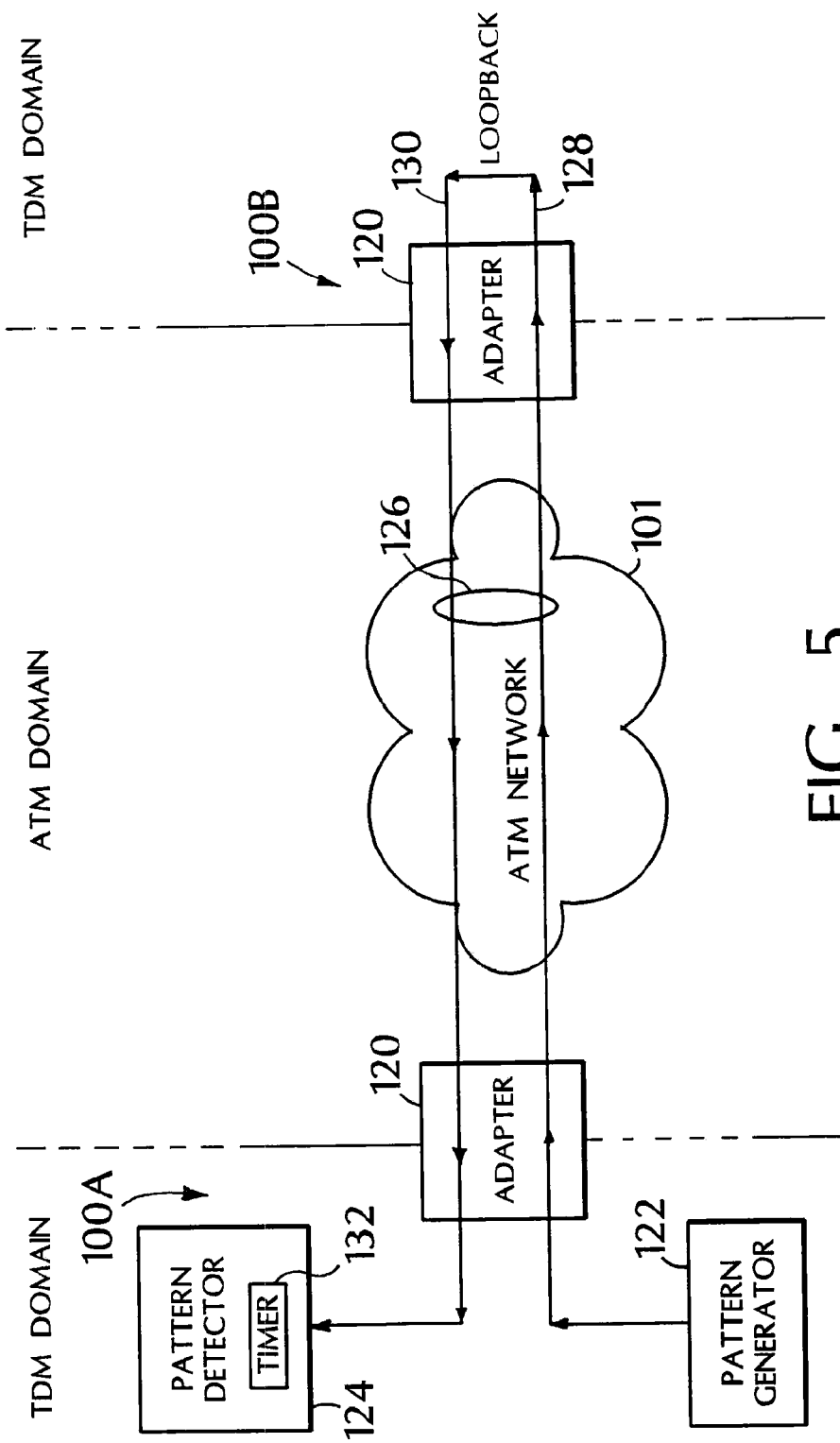
FIG. 5 illustrates further details for performing a continuity check operation.

In response, the terminating gateway 100B establishes 270 a packet domain connection 126 with the originating gateway 100A through the packet network 101, as shown in FIG. 5. As part of setting up the packet domain connection, the information that uniquely identifies the call is forwarded through the packet switches 110, 115 until it is received by the originating gateway 100A. That allows the originating gateway 100A to associate the packet-domain connection with the TDM-domain connection for the call. The gateways 100A, 100B and ATM switches 110, 115 negotiate the ATM routing headers that will be used between hops along the packet-domain connection.

The gateway 100B also sets up 275 a continuity check loop between the incoming and outgoing packet streams 128, 130 associated with the packet network connection. FIG. 5 shows the loopback provided in the TDM-domain of the gateway 100B. More generally, however, the loopback can be provided in either the TDM-domain or the packet-domain depending on the type of failures the continuity check is intended to detect. A control message (CreateAck) 178 is sent 280 by the terminating gateway 100B to the terminating call controller 120B to acknowledge that the packet-domain connection has been established for the call and that the continuity check loop has been set up. The bit pattern appears as successive TDM samples in the TDM domain, when the loopback is provided in the TDM domain, and appears within the cell stream in the ATM domain.

As the pattern generator 122 repeatedly generates the specified pattern of bits, the pattern detector 124 monitors 245 the incoming bit patterns and determines 285 (FIG. 3A) whether the incoming pattern matches the bit pattern that was generated by the generator 122. If the packet connection is properly established and if the adaptation functions in the gateways 100A, 100B are operating properly, the specified bit pattern will be detected by the detector 124 after traversing the packet connection 116 and the continuity check loop.

The pattern detector 122 can include a software or hardware timer 132 that provides a timeout function. If the pattern detector 124 does not detect the generated pattern within the time set by the timer 132, the continuity check fails. In that case, the gateway 100A signals 165 the call controller 120A or a management system (not shown) to inform 290 it of the failure. The results of the continuity check operation can be used to determine the cause of the failure.

On the other hand, if the generated pattern is detected within the time set by the timer, then the continuity check is successful. The gateway 100A disconnects 295 the pattern generator 122 to allow a purge operation to be performed so that the pattern of bits is not forwarded to the TDM circuit handling the call. Once the detector 124 no longer detects the pattern, the adaptation layer 116 in the originating gateway 100A is connected 300 to the DS0 circuit that is handling the call.

If the continuity check is successful, the gateway 100A also notifies 305 its call controller 120A that the pattern has been detected. The originating call controller 120A sends 310 an SS7 message to the terminating call controller 120B informing it of the successful continuity check. In response, the call controller 120B instructs the terminating gateway 100B to disconnect 315, the loopback between the incoming and outgoing packet streams. The terminating gateway 100B is then reconfigured 320 to continue processing the call.

Continuity check packets also can be used as a coarse determination of the Cell Delay Variation in the packet network. In that case, the pattern of bits should be sent over at least several cells.

The foregoing continuity check operations can be used in systems employing "robbed" bit supervisory signaling as well as clear channel operation. However, when the continuity check packets are used in a system employing "robbed" bit supervisory signaling, the fact that the low order bits of some frames are used for the supervisory signaling should be accounted for. For example, the bits that are used for supervisory signaling can simply be ignored for the purpose of the continuity checks.

As described above, different call controllers 120A, 120B are associated with the gateways 100A, 100B. However, in some cases, both the originating and terminating gateways 100A, 100B may share a common call controller, such as the call controller 120A. In that case, a technique similar to that discussed above can be used with a single call controller performing the functions of both call controllers 120A, 120B. When the call controller 120A routes the call after receiving the IAM message 150, it selects the terminating TDM circuit switch and the corresponding terminating gateway 100B to handle the call. Also, when a single call controller 120A is involved, the IAM message 156 need not be used.

Although the foregoing implementations have been described with respect to ATM networks, circuit-switched traffic can be routed over other packet-domain networks, such as frame relay, Ethernet and Internet Protocol (IP) networks, as well.

Continuity check operations based on a pattern of digital bits are not limited to systems under the control of SS7 signaling. In addition, continuity checks can be performed independently of call set-up processes. For example, in some cases, the pattern generator 122 can continuously generate a pattern over an existing packet connection. The pattern detector 124 monitors the return signals and checks whether the specified pattern is detected. The output of the pattern detector 124 then can be read on demand. Such testing can be used, for example, as part of a maintenance program to determine how often failures occur on a particular packet connection and its associated gateways.

For situations in which a gateway has multiple adapters for handling conversions between packet-based and TDM-based bearers, separate pattern generators 122 and pattern detectors 124 can be provided for each adapter. Alternatively, the specified pattern can be broadcast over the multiple ATM channels and/or connections.

In some implementations, the timer 132 can be incorporated into the call controller 120A. In that case, the call controller 120A would determine that the continuity check had failed if the gateway 100A did not notify it that the continuity check was successful within the specified time. Alternatively, the call controller 120A can be programmed to query the gateway 100A regarding the success of the continuity check if the gateway has not provided an indication prior to the specified time elapsing. The success or failure of the continuity check would then be determined based on the gateway's response.

Various features of the system can be implemented in hardware, software, or a combination of hardware and software. For example, some aspects of the system can be implemented in computer programs executing on programmable computers. Each program can be implemented in a high level procedural or object-oriented programming language to communicate with a computer system. Furthermore, each such computer program can be stored on a storage medium, such as read-only-memory (ROM) readable by a general or special purpose programmable computer, for configuring and operating the computer when the storage medium is read by the computer to perform the functions described above.

Other implementations are within the scope of the claims.

What is claimed is:

1. A method of performing a continuity check operation comprising:
    sending a sequence of cells, each cell having a specified pattern of bits, over a packet network connection through a first interface on the packet network to a second interface on the packet network;
    monitoring the first interface for a return sequence of cells over the packet network connection; and
    deciding whether the continuity check operation is successful based on whether a pattern of bits of the return sequence of cells matches the specified pattern of bits of the sent sequence of cells.

2. The method of claim 1 including providing a loop between incoming and outgoing packet streams associated with the packet network connection.

3. The method of claim 1 including repeatedly sending the pattern of bits over the packet network connection during the monitoring.

4. The method of claim 1 wherein the continuity check operation is performed during a set-up process for a narrowband call over the packet network.

5. The method of claim 1 wherein the continuity check operation includes sending Signaling System 7 messages.

6. The method of claim 1 wherein the pattern of bits sent over the packet network connection includes a first byte all of whose bits are a first value and a second byte all of whose bits are a second different value.

7. The method of claim 1 wherein the pattern of bits includes multiple bytes each having multiple bits, wherein a single bit in each byte has a value that differs from all other bits in the byte, and wherein the bit having the different value is shifted by one position between adjacent bytes.

8. The method of claim 1 wherein the pattern of bits includes first and second bytes each of whose bits alternate in value, and wherein the value of the second byte is the complement of the value of the first byte.

9. The method of claim 1 wherein the continuity check is considered a failure if the pattern of bits is not detected at the first interface during monitoring within a specified period.

10. An apparatus configured to adapt circuit-switched and packet-based bearers and configured to execute continuity check operations, the apparatus comprising a bit pattern generator and a bit pattern detector, wherein the pattern generator is arranged to generate a sequence of cells, each cell having a specified pattern of bits to be sent over a packet network connection, and the bit pattern detector is arranged to monitor a return sequence of cells over a packet network connection, wherein the apparatus is configured to decide whether a continuity check is successful based on whether a pattern of bits of the return sequence of cells matches the specified pattern of bits in the sent sequence of cells.

11. The apparatus of claim 10 wherein the bit pattern generator is arranged to send the pattern of bits repeatedly over the packet network connection.

12. The apparatus of claim 10 configured to perform the continuity check during a set-up process for a narrowband call over the packet network connection.

13. A communications system comprising:
    a packet network; and
    a first gateway comprising a bit pattern generator and a bit pattern detector, wherein the bit pattern generator is arranged to generate a sequence of cells, each cell having a specified pattern of bits to be sent over a connection in a packet network, and the bit pattern detector is arranged to monitor a return sequence of cells over a packet network connection, wherein the gateway is further configured to decide whether a continuity check is successful based on whether a pattern of bits of the return sequence of cells matches the specified pattern of bits in the sent sequence of cells.

14. The system of claim 13 including a second gateway coupled to a second interface on the packet network and configured to provide a loop between incoming and outgoing packet streams associated with the packet network connection.

15. The system of claim 13 wherein the bit pattern generator is arranged to send the pattern of bits repeatedly over the packet network connection.

16. The system of claim 13 wherein the first gateway is configured to perform a continuity check during a set-up process for a narrowband call over the packet network connection.

17. An article comprising a computer-readable storage medium including computer-executable instructions for causing a computer system to:
    send a sequence of cells, each cell having a pattern of bits, over a packet network connection through a first interface on a packet network to a second interface on the packet network;
    monitor the first interface for a return sequence of cells over the packet network connection; and
    decide whether a continuity check is successful based on whether a pattern of bits of the return sequence of cells matches the specified pattern of bits in the sent sequence of cells.

18. The article of claim 17 including instructions for causing the computer system to:
    provide a loop between incoming and outgoing packet streams associated with the packet network connection.

19. The article of claim 17 including instructions for causing the computer system to:
    repeatedly send the sequence of cells over the packet network connection during the monitoring.

20. The article of claim 17 including instructions for causing the computer system to perform the continuity check during a set-up process for a narrowband call over a packet network.

* * * * *